United States Patent [19]

Bentley

[11] Patent Number: 4,901,611
[45] Date of Patent: Feb. 20, 1990

[54] APPARATUS AND METHOD FOR CUTTING MULTS FROM BILLETS

[76] Inventor: Richard J. Bentley, 6925 Aragon Circle, Unit #30, Buena Park, Calif. 90620

[21] Appl. No.: 331,034

[22] Filed: Mar. 30, 1989

Related U.S. Application Data

[63] Continuation of Ser. No. 174,777, Mar. 29, 1988, abandoned.

[51] Int. Cl.$^4$ ............................................. B23B 5/14
[52] U.S. Cl. ..................................... 82/100; 82/101; 83/368; 83/371
[58] Field of Search ................. 83/79, 80, 360, 368, 83/370, 371; 82/47, 53.1, 57, 58, 59, 60, 45, 83, 84, 90, 91, 92, 93, 94, 95, 96, 97, 100, 101, 102

[56] References Cited

U.S. PATENT DOCUMENTS

| | | | |
|---|---|---|---|
| 3,835,740 | 9/1974 | Peytavin | 82/47 |
| 4,052,822 | 10/1977 | Obear | 82/47 |
| 4,330,019 | 5/1982 | Murphy | 83/368 |
| 4,589,165 | 5/1986 | Lerner | 83/368 |
| 4,596,172 | 6/1986 | Visser | 83/371 |

Primary Examiner—Frederick R. Schmidt
Assistant Examiner—Blynn Shideler
Attorney, Agent, or Firm—William H. Pavitt, Jr.; Ralf H. Siegemund; Vernon D. Beehler

[57] ABSTRACT

A method and machine for cutting precise sized mults from billets of a nickel based alloy, which involves rotating each billet by means of a chuck while the billet is supported on rollers coaxially in the chuck; providing a track parallel to the billet axis and a carrier movable along the track, on which carrier is disposed a rotatable saw movable toward and from the axis of the billet to effect cutting, the location of the saw cut being determined by a computer programmed to control a servo motor acting on a screw coupled to the carrier by nut means, the computer being provided not only with basic information as to the density and stated diameter of the billet, but with information as to variations in such diameter, detected by sensor means provided on the carrier in proximity with the saw, and transmitted to the computer.

3 Claims, 2 Drawing Sheets

APPARATUS AND METHOD FOR CUTTING MULTS FROM BILLETS

This is a continuation of U.S. patent application Ser. No. 07/174,777 filed on 29 March 1988 now abandoned.

FIELD OF THE INVENTION

This invention relates generally to the field of sawing metal billets into sections, and has particular application to producing mults of accurate masses for forging or other processing of the same.

BACKGROUND OF THE INVENTION

As a precursor to producing nickel base alloy metal parts by the process of forging, it is necessary first to produce mults or other pieces of rough metal stock to be subjected to the forging process. For certain forging operations, such mults are produced by cutting them from billets which may be cast, forged or rolled into metal pieces of diameters varying from 2 to 12 inches and lengths up to 20 feet. Such billets may be generally cylindrical, squared or squared with rounded corners. If the billets are thick and long, each billet obviously will be of great weight and not easily handled. Cutting them into segments to form mults can be a difficult process and one which not only may produce a severe stress on the saw being utilized, but sawing them into mults of a precise mass has been found to be quite difficult. One cause of this difficulty is the fact that if a saw blade is required to cut through the entire thickness of the billet along a single diameter, the blade may bind as it advances its cut in the billet, and/or the blade may tend to drift off its initial cutting plane.

DESCRIPTION OF THE PRIOR ART

To avoid such binding and blade drifting, it has been proposed in such patents as U.S. Pat. Nos. 3,835,740 and 4,052,822 to insert the billet to be cut into a rotating chuck and, while the billet is being rotated, subjecting it to cutting action by advancing the saw blade toward the center of the billet in a plane normal to its axis. While this procedure may indeed minimize binding and drift of the saw blade, there remains the problem of determining along what line to make the cut in such a plane normal to the billet axis. Where the metal rod being cut into billets is inexpensive, it may suffice to move either the saw or the rotating chuck holding the billet relative to the other by a predetermined distance sufficient to produce a mult of a mass required for subsequent forging. In such case, it would not matter if the mult should comprise a mass somewhat greater than is actually necessary to produce the forging. However, where the billet is fabricated of a special nickel base alloy, and is to be cut into mults of an exactly determined mass for forging into aircraft, jet, rocket or other sophisticated parts, it is essential on the one hand that each mult have sufficient mass for forging into the desired part, but on the other hand, no more than necessary in order to minimize any waste of the billet material. Consequently, the axial altitude of the cylindrical or other configured mult should be accurately determined and the billet cut along the precise line in the plane normal to the axis of the billet. The determination of this precise desired axial altitude can be difficult, however, since most billets are not perfectly configured as cylinders or of rectangular or other regular cross sections. Variations in the radius or other dimensions of the billet must be detected and taken into account in determining the exact altitude of the mult to be cut off the billet, in order to produce a mult of the precise desired mass.

Heretofore the only effort to take into account variations in the diameter or other dimensions of the billet has been by observation and calipering where substantial dimensional deviations are noted. Then, taking into account the density of the billet material, its diameter or other dimensions, including any variations from an assumed norm, one may then determine the axial altitude of the billet to be cut and manually position the saw blade accordingly. In this connection, account must also be taken of the thickness of the cut accomplished by the blade as the billet is rotated. If the billet should vary in diameter along its length, it would require remeasuring and recalculating to determine the saw position each time a cut is made.

It should be readily apparent that such a procedure is not only most time consuming, but will require the services of an engineer capable of making the necessary calculations. Either such engineer will also have to operate the saw to position the same, or an additional saw operator will be required. In all, the process of cutting high temperature alloys as presently practiced can be cumbersome, inefficient, costly from a time and labor standpoint, or expensively wasteful if the axial altitude of the billet is only approximated in setting the saw for the cutting process.

SUMMARY OF THE INVENTION

The present invention provides apparatus which operates according to a system by which the setting of the saw blade may be automatically determined and set over the entire length of the billet. The invention may readily be adapted for cutting a billet into mults separately and independently from each end of the billet. Thereby, one machine not only may effectively accomplish each individual cutting operation more effectively and efficiently than billet cutting can be accomplished by present methods and apparatus, but a single machine may be cutting two mults simultaneously from opposite ends of the billet to further greatly reduce the time required for cutting off any given number of mults from a long billet.

The apparatus of the present invention is centered about a chuck which is adapted to receive a billet and to rotate the same at a predetermined rate of rotation. The billet to be thus rotated is passed through the chuck so that at least one end of the billet extends from the chuck along its axis of rotation. Roller support means desirably are provided on which the thus extended end of the billet may be supported for rotation. The apparatus may be constructed, however, to dispose the center of the billet in the chuck with the two ends of the billet extending axially in opposite directions from the chuck. In such disposition of the billet, each end should be rotatively supported for a separate cutting operation.

To accomplish the cutting, a track is provided spaced from and parallel to the axis of the chuck and the billet about which it is clamped. If cutting is to be accomplished only on one side of the chuck by a single saw blade or abrasive disk, the track would only extend from the center of the chuck outwardly to a point slightly beyond the end of the billet projecting from the chuck. On the other hand, if cutting is to be accomplished simultaneously from the opposite ends of the billet, the track would then also extend oppositely from the chuck to a point beyond the other end of the billet.

A carrier member is provided to slide along the track between its end and the chuck. This carrier member may be provided with a motor or other drive means to move the carrier along the track and to dispose it in any fixed position along the track. Also carried by the carrier is a saw blade or abrasive disk which may be moved in a direction to and away from the axis of the billet by hydraulic or electrical means. Also disposed on the carrier adjacent the saw on its side facing the chuck, is a sensor transducer which extends along a line normal to the axis of the billet for rolling, resting contact with the outside surface of the billet. This sensor transducer is responsive to any deviation in the diameter or other assumed dimension of the billet, and will provide data to a computer, such as an IBM PC, concerning the diameter or other assumed dimensions of the billet, and any deviations from such assumptions. This data, when inputed to the computer, enables a program therefor, which takes into account the density of the metal of the billet and the thickness of the cut expected from the saw blade, to determine the precise desired axial altitude of the billet; and, upon such determination to actuate a servo to move the carrier along the track and set the carrier in a position adjacent the billet whereat, when the saw blade is then advanced along a line coinciding with a radius of the billet, the rotating billet will be cut to produce a mult of the exact desired mass.

Where it is desired to cut mults from both ends of the rotating billet, a similar carrier with a saw and sensor transducer linked to a computer which controls a servo, is provided on the opposite side of the chuck.

It will be readily appreciated by persons skilled in the art that the apparatus and method of the present invention greatly facilitates the cutting of billets of high temperature alloy materials into mults of precise masses for subsequent forging operations. Not only is the axial altitude of each mult precisely calculated as a result of the input to the computer of data concerning the variations in the diameter or other dimensions of the billet, but, as soon as the cutting of one mult is completed and the saw withdrawn, the carrier is moved to set the saw in position to make the proper cut for the next mult. Moreover, the apparatus may easily be adapted to provide simultaneous cutting from the opposite end of the billet towards the chuck in which the billet may be centrally disposed. By this apparatus and the process thus executed by it, the rate of cutting accurately sized mults from a billet is greatly increased, and the machine may be tended by a single operator who need not have the degree of skill required for the cutting of billets according to currently employed methods. Thus, not only is there effected a considerable saving of materials which are currently wasted, but labor costs for accomplishing cutting are greatly reduced, and the cutting rate is many times that of current methods. Beyond these savings, however, is the fact that with the cutting of accurately sized mults, it generally becomes entirely unnecessary to machine the mults to reduce their masses to a range acceptable to the forger.

DESCRIPTION OF THE DRAWINGS

In the accompanying drawing.

DESCRIPTION OF THE PREFERRED EMBODIMENT

Figure 2:
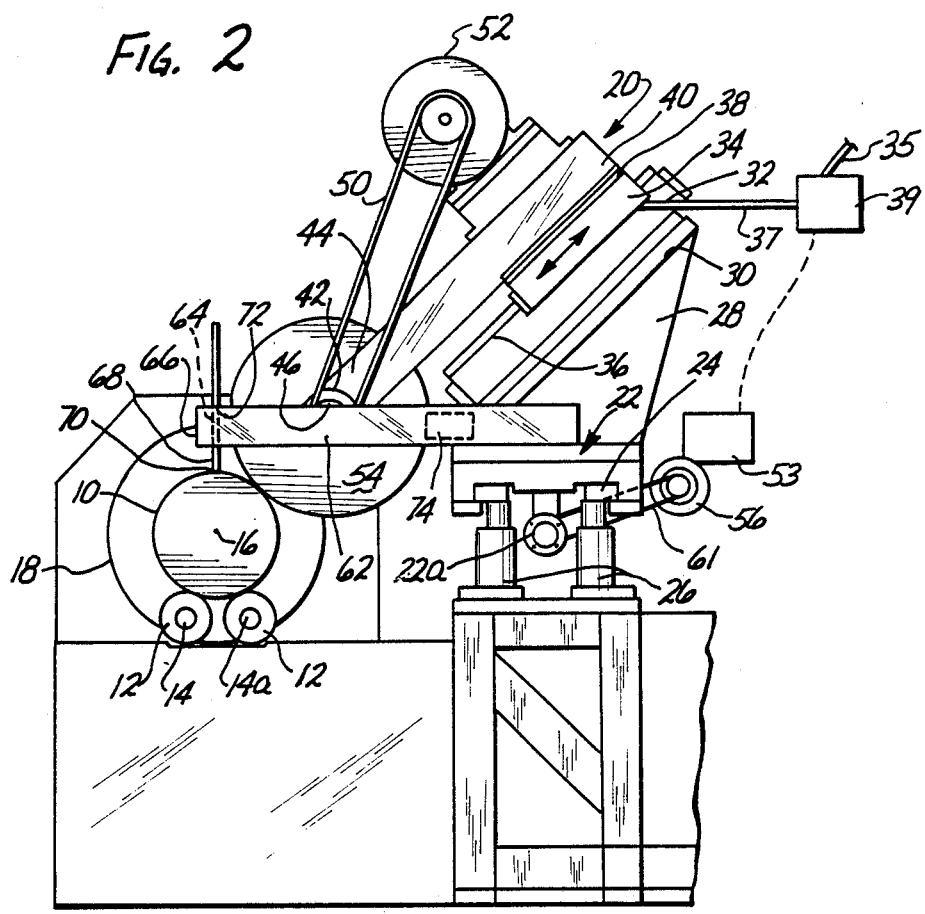
FIG. 2 is a side elevation partly in section on the line 2—2 of FIG. 1.

In the drawings, 10 represents a billet of nickel based alloy, such as INCO 718, which billet, as shown in FIG. 2 is generally circular in cross section. The billet 10 is supported by rollers 12 each of which rotates about an axis 14, 14a which is parallel to the axis 16 of the billet 10. The billet 10 is centrally disposed within a chuck 18 which is powered by a motor (not shown) to rotate also about the axis 16 when the chuck 18 is clamped about the central portion 10a of the billet 10.

The cutting of the billet 10 is accomplished by a saw apparatus 20 which is provided and may be moved along a track 24 spaced from, but extending parallel to the billet 10.

The arrangement of the saw apparatus 20 may best be understood from FIG. 2. The apparatus 20 is mounted on a carrier 22 adapted to slide along a pair of tracks 24 supported by bases 26. The tracks 24 extend parallel to the axis 16 of the billet for the length of that portion of the latter outside of the chuck 18 which is to be cut into mults. Thus, the tracks would terminate approximately at the mouth of the chuck 18.

The actual saw mounting may be comprised of a backing portion or weldment 28 secured on top of the carrier 22, and having a slanting face 30 of the order of 45 degrees, upon which face is affixed a support 32 for a pneumatic cylinder 34 adapted to reciprocate on a shaft 36. Affixed to the side wall 38 of the cylinder to be reciprocable therewith is the saw support plate 40. Rotatably carried in a cylindrical bearing 42 mounted transversely on the lower portion 44 of the support plate 40, is an axle 46 about one end of which 48 passes a drive belt 50 from a motor 52. The latter is also mounted on the support plate 40 to move reciprocably therewith. A circular saw blade 54 is provided at the opposite end of the axis 46 to rotate therewith as it is driven by the motor 52.

Movement of a carrier 22 along the tracks or guideway 24 is accomplished by a reversible drive motor 56 connected to a screw 57 which is mounted at its inner end 57a rearward of the mouth 18a of the chuck 18 in a bearing 59a, and at its outer end, in a support bearing 59b. The motor 56 may be connected to the screw to drive the same by a gear train 61, thereby to enable the screw to be rotated slowly in small increments in either direction. A servo control 58 is provided to switch the motor 56 on and off and for desired rotation through the gear train 61.

The screw 57 is passed through what may be termed a nut 22a pending from and secured to the carrier 22, such nut 22a having threading mating with the threading 57c of the screw 57. Thereby any rotation of the screw 57 will result in moving the nut 22a along the screw 57, and the carrier 22 attached to the nut 22a is correspondingly moved along the tracks 24. Thus, the drive motor 56, when actuated, will cause the carrier 22 to move in controllable increments in either direction along the tracks 24.

To actuate the motor 56 and hence the positioning of the carrier 22, a servo control 58 is provided. This servo control 58 is responsive to electrical command signals which emanate from a computer control device 60.

The movable saw apparatus is also provided with a feeler arm 62, one end of which is secured to extend horizontally from the carrier 22 to where its end may be disposed radially outwardly of, and above, the billet 10.

Seated slidably and loosely in a passage 64 in the projecting end 66 of the feeler arm 62 is a sensor probe 68, in such manner that the lower end 70 of the probe 68 may be in contact with the outside surface of the billet 10. The probe 68 is disposed in the passage 64 to float upwardly or downwardly within a predetermined range with reference to a marker 72 which may represent the assumed radius of the billet. Information as to the movement of the probe 68 in relation to the marker 72 may be transmitted by a wireless data link processor 74 provided in the arm 62 to the computer control device 60. The computer control device 60 is programmed, upon receipt of information concerning the positioning of the probe 68, to determine the precise positioning of the saw blade 54 relative to the end of the billet 10 to produce a mult of a predetermined mass.

When such determination is made by the computer control device 60, an electrical control signal is generated for transmission to the servo control 58. The latter, in response to such signal, activates the motor 56 to move the saw device carrier 22 along the tracks or guideway 24 to dispose the saw blade in the proper plane transverse to the billet axis 16. When such disposition of the saw blade has been accomplished, an operator of the equipment first switches on the motor 52 (if it has not been previously left running) to rotate the saw blade; and, secondly pushes a control lever 35 to operate the pneumatic cylinder 34, thereby advancing the saw support plate 40 in a direction radially toward the billet 10 to where the blade 54 is brought into contact with the rotating billet 10 to produce a cutting circumferentially as the billet is rotated by the chuck 18 until the saw blade 54 has reached close to the billet axis 16, whereupon the cut will have been completed and the mult of the desired mass produced.

In actual use, the computer control device 60 may initially signal the servo control 58 to move the carrier 22 to the place on the track where the probe 68 is disposed at the outer end 10' of the billet. From there, the carrier 22 is moved back toward the chuck 18 so that the probe 68 is advanced along the rotating billet 10 to sense any variation from the assumed dimensions of the billet. After the probe 68 has traversed as far as necessary to sense out the length of the billet 20 to be cut, the carrier 22 is then moved back to dispose the saw 54 to the plane at which the billet 10 is to be cut, and the operator then accomplishes the cutting in the manner previously described.

Figure 1:
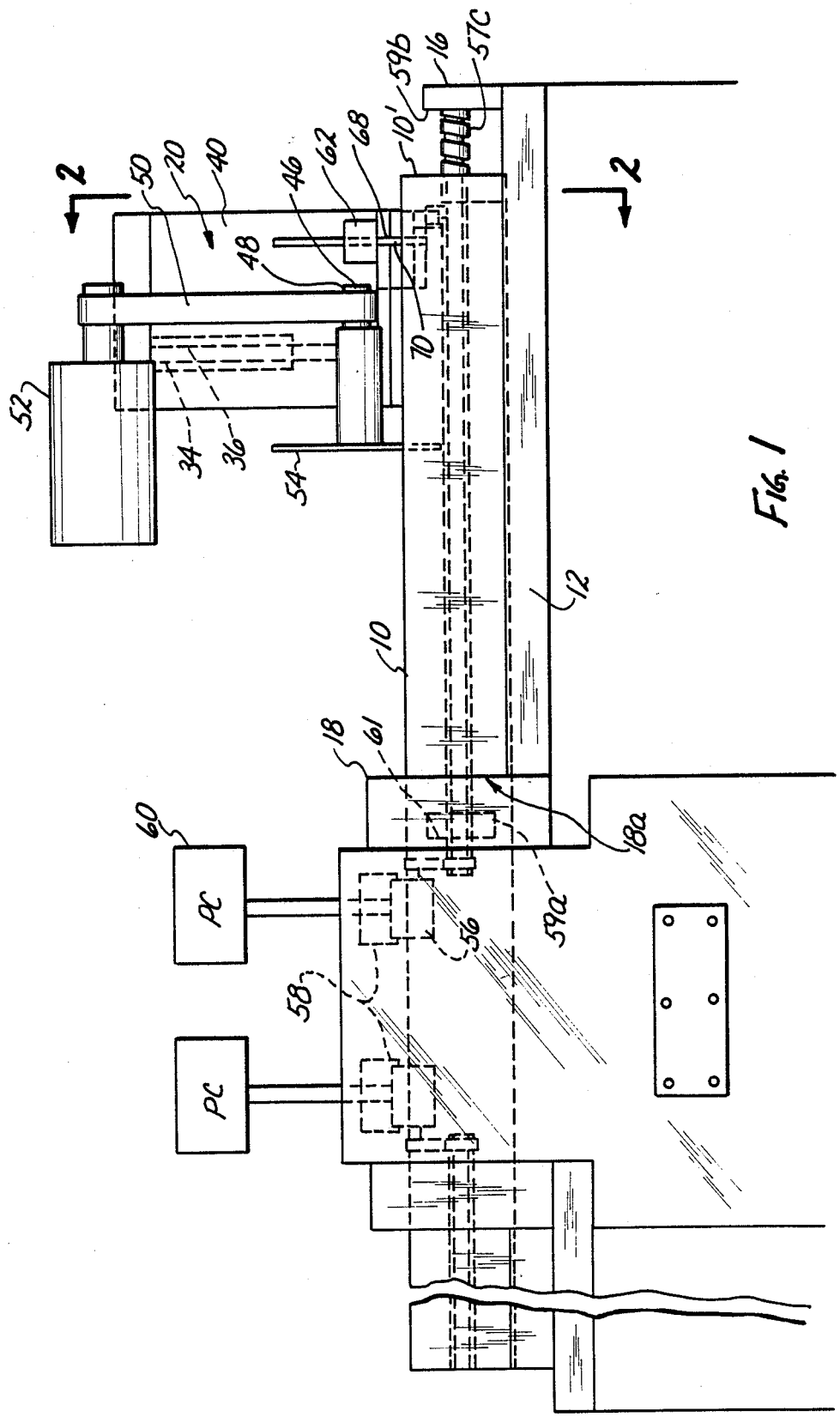
FIG. 1 is an elevation, partly schematic, of the layout of the preferred embodiment of the invention.

While the present invention may be practiced with the apparatus shown on the right hand side of FIG. 1, if desired, and to improve efficiency in cutting long billets, the apparatus shown on the right hand side of FIG. 1, may be oppositely duplicated on the left hand side as is partially illustrated. With such a double arrangement, although the chuck 18, support rollers 12 and tracks 24 may be simply integral extensions of each other, each saw apparatus 20, the carrier 22, computer control device 60, servo control 58, motor 56, gear train 61 and screw 57c desirably should be separate so they can be independently operated to cut mults from each end of the billet 10 simultaneously. With such a double sawing operation, the time for cutting mults from long billets may effectively be halved.

I claim:

1. Apparatus for accurately cutting a billet of metal into a series of mults each of a predetermined mass, said apparatus comprising:

(a) a rotatable chuck adapted to grip and rotate a metal billet about a first horizontal axis, with a portion of said billet projecting outwardly from said chuck along said first axis;
(b) means to support said portion of the billet for rotation about said first axis;
(c) a stationary base to support said chuck for rotation about said axis;
(d) drive means to rotate said chuck for rotation about said axis;
(e) track means extending parallel to said axis and spaced from the portion of the billet extending from said chuck;
(f) carrier means supported by and slidable along said track means;
(g) drive means to move said carrier means along said track means to any determined point on said track means and to temporarily retain it at said point;
Said carrier means supporting:
(i) A driven rotary cutting device, said cutting device being rotatable about a series of axes, each being parallel to the said first axis;
(ii) Means to enable said cutting device to be advanced or retracted in a plane normal to the first axis, so that, when advanced, said cutting device presents its cutting edge against the rotating billet to cut inwardly at least substantially to the axis thereof, and, upon completing the cutting of the billet, said cutting device may be retracted from said billet, said means to enable cutting device to be advanced or retracted including a first support member secured on said carrier means, said member having a face parallel to said first horizontal axis, a second support member carried by and linearly slidable reciprocably on said face toward and away from said first horizontal axis, the cutting device and its driving means being mounted upon said second member to move therewith, and fluid actuation means connected to both said first member and said second member to drive the latter reciprocably with respect to the first member; and
(iii) Transducer-sensor means adapted to be maintained in contact with the billet to determine the diameter of the billet and to detect variations thereof in its diameter or other assumed dimensions, and to generate electrical signals indicative of such data so determined and detected, said transducer-sensor means including a displaceable sensor probe, said sensor probe displacement responsive to the diameter of said billet defining said electrical signals;
(h) computer means to receive the data from said transducer-sensor means respecting said deviations, said computer means being programmed to utilize said data with other assumed data relating to the billet to determine the point along said track means to which the carrier means is to be moved and temporarily secured, and to emit appropriate electrical command signals properly to dispose and temporarily secure its carrier means on the track means for cutting the billet to produce a mult of such predetermined mass; and
(i) servo means responsive to electrical command signals from the computer to actuate the means to move the carrier means to dispose the carrier means on the track means and to secure temporarily at the predetermined point on said track means;

Whereby the means to advance or retract the cutting means may be actuated to advance the cutting means to cut the rotating billet and thereafter retract it.

2. Apparatus as described in claim 1 wherein the means to move carrier means comprises:

(A) A reversible motor driven screw means extending substantially the length of the track means along which the carrier mean travels; and (B) Nut means secured to the carrier and having threading mating with that of the screw means and encompassing said screw means; whereby rotation of the screw means serves to drive the nut means and its attached carrier means along the track means.

3. Apparatus as described in claim 1 wherein the track means comprises a pair of rails spaced from each other and supported in a disposition spaced laterally from each other and parallel to said first horizontal axis and further spaced laterally from the billet, and the carrier means comprises a member having a body of an inverted U-shaped cross section, slidable on said rails, and the side portions of said body extend about the outer sides of said rails, with flanges further extending at least partially below said rails to prevent the carrier means from inadvertently being lifted off said rails.

* * * * *